Nov. 23, 1937.  E. V. DARDANI  2,100,024
ODOMETER FOR MOTOR VEHICLES
Original Filed June 4, 1934    2 Sheets-Sheet 1
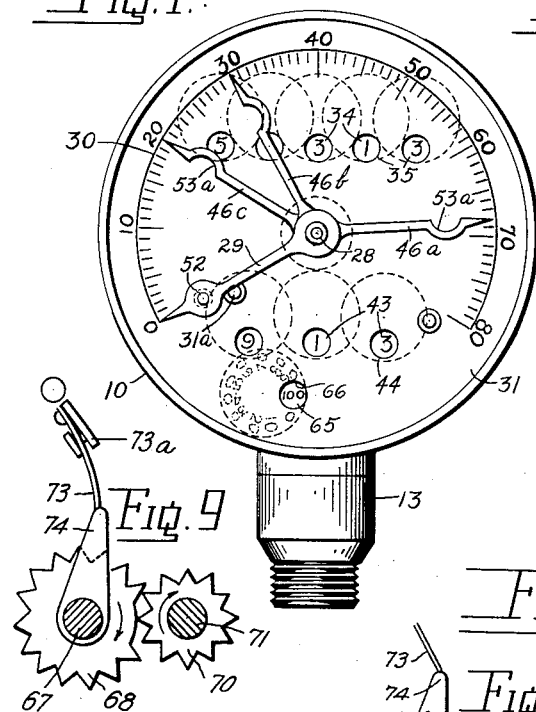
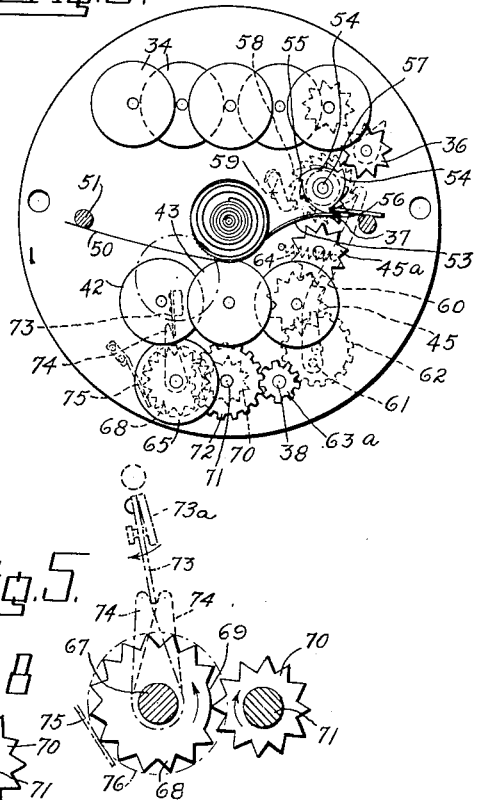
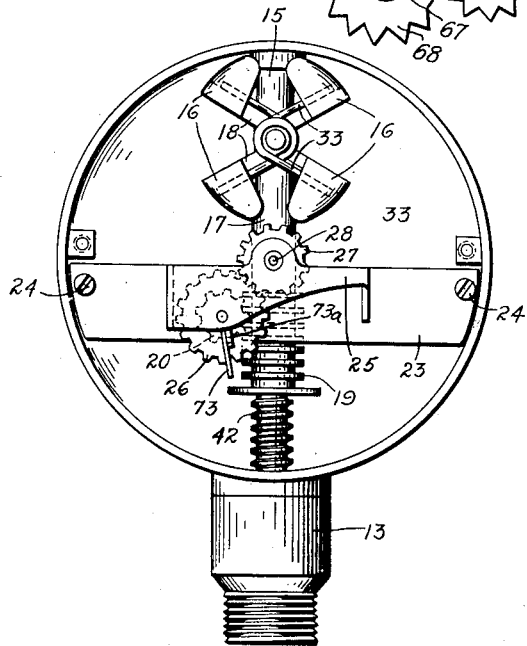
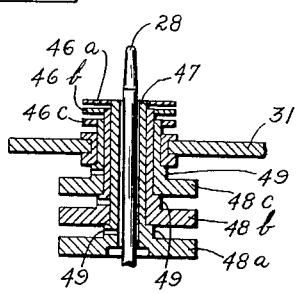
INVENTOR.
Edward V. Dardani
BY
ATTORNEY Nov. 23, 1937.  E. V. DARDANI  2,100,024
ODOMETER FOR MOTOR VEHICLES
Original Filed June 4, 1934   2 Sheets-Sheet 2
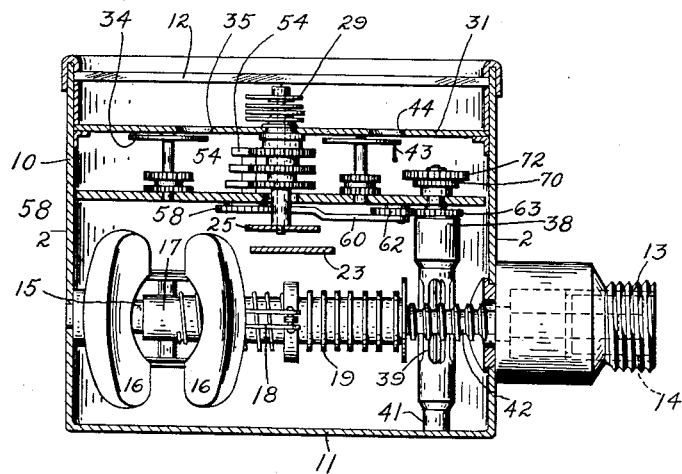
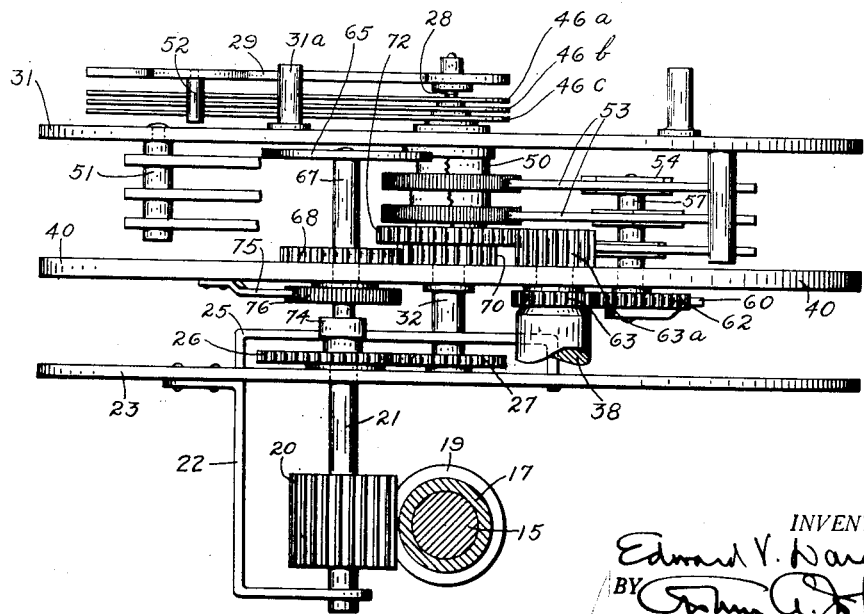
INVENTOR.
Edward V. Dardani
BY
ATTORNEY Patented Nov. 23, 1937

2,100,024

UNITED STATES PATENT OFFICE 2,100,024

ODOMETER FOR MOTOR VEHICLES

Edward V. Dardani, Southport, Conn.

Original application June 4, 1934, Serial No. 728,951. Divided and this application December 15, 1934, Serial No. 757,661

11 Claims. (Cl. 235—95)

This invention relates to odometers for motor vehicles, and this application is a division of my application Serial No. 728,951, filed June 4, 1934.

The feature of this invention claimed herein is the provision of means to indicate the distance traveled by the vehicle since it was last stopped. In many communities the laws or ordinances require a vehicle to come to a complete stop at intersections, especially crossing or entrances to arterial highways. Frequently, officers and others at these intersections mistakenly accuse drivers of failing to stop.

With the device of the present invention, the driver will be in position to prove that the vehicle was actually stopped by measuring the distance from the stop line to the point at which the vehicle was halted by the officer, and comparing this with the indication on the instrument.

Likewise, should a vehicle have traveled only a short distance before being involved in an accident, the driver may establish the fact that he had traveled only the number of feet indicated on the instrument from a standstill.

Besides, the device of the present invention may be employed by the driver to ascertain for himself the distance traveled while shifting gears, so that he may be apprised of the rate of acceleration of the vehicle and be governed accordingly.

To accomplish this, in the form of the invention herein illustrated, there is provided a normally inactive distance counter which is set into action by the speed-responsive means in returning to zero position. According to the present invention, this distance counter may continue to count the distance traveled until the car is again stopped, but, for practical purposes, it is sufficient for the distance counter to go out of operation after the vehicle has traveled a limited distance—for instance, one or two hundred feet.

Other features and advantages will hereinafter appear.

In the accompanying drawings—

Figure 1 is a front elevation of the instrument of the present invention.

Fig. 2 is a vertical section taken approximately on the line 2—2 of Fig. 6, omitting the drive shaft for the distance counters.

Fig. 3 is a front view of one of the supporting plates in the instrument, showing the distance-indicators as well as the other parts of the present invention.

Fig. 4 is a detail sectional view showing the mounting means for the auxiliary pointers.

Fig. 5 is a detail view showing the means for initiating the operation of the counter which indicates the distance traveled immediately following the stopping of the vehicle.

Fig. 6 is a transverse sectional view showing the instrument of the present invention.

Fig. 7 is a view on an enlarged scale of the mechanism for indicating the rate of deceleration of the vehicle.

Figs. 8 and 9 are like Fig. 5, but show various relative positions of the means for controlling the connection of the distance counter to the actuator.

As shown in the accompanying drawings, the instrument to which the present invention is applied comprises a casing 10 of cylindrical form having a back 11 and an open front covered by a glass 12 through which the various indicators may be viewed. At its lower end, the casing is provided with the usual speedometer drive connection 13 having a flexible shaft coupling 14 (see Fig. 6) connected to a vertical shaft 15 on which there are pivotally mounted the usual weights 16 found in centrifugally operated speedometers. Slidably mounted on the shaft 15 is a sleeve 17 connected by links 18 to the weights 16 so that, as the weights are thrown out by centrifugal force, the sleeve 17 will move upwardly as shown in Fig. 2, and toward the left as shown in Fig. 6, and in accordance with the outward movement of the weights.

The sleeve 17 has a set of rings 19 forming gear teeth meshing with a pinion 20 on a shaft 21, the rings 19 maintaining engagement with the pinion 20 even though the sleeve rotates as it is moved longitudinally.

At one end, the shaft 21 is journaled in a bracket 22 (Fig. 7) extending downwardly from a cross bar 23 fastened in the casing by means of screws 24, and at its upper end is journaled in the cross bar 23 and also in a bracket 25. Between the bracket 25 and the cross bar 23 the shaft has a gear 26. This meshes with a gear 27 on a shaft 28 which carries the main speed indicator or pointer 29. The pointer 28 swings around the casing over a scale 30 provided on a plate 31 at the front end of the casing. Thus, as the sleeve 17 moves upwardly as viewed in Fig. 2, the pointer 29, through the pinion 20, shaft 21, gears 26 and 27, and shaft 28, will rotate clockwise as viewed in Fig. 1, from a position of rest against a stop 31a and thus indicate the speed at which the vehicle is traveling.

The shaft 28 for the pointer is journaled in a bearing 32 carried by the bracket 25. Springs 33 located between the weights and tending to move the weights toward the shaft 15 return the pointer, shaft, and connected gearing to zero position on the scale against the stop 31a when the shaft 15 slows down and stops as the vehicle decelerates and comes to rest.

As is customary, the instrument of the present invention is provided with a row of totalizer wheels 34 having numerals showing through sight openings 35 in the plate 31. These wheels are supplied with the usual carry-over mechanism not shown and with a driving train including a gear 36 actuated by a single tooth 37 driven, as explained below, by a gear 62 meshing with a gear 63 on a shaft 38 which is provided with a worm gear 39. The shaft 38 is journaled on a plate 40 located between the cross piece 23 and the plate 31 and has its other end journaled in a bearing 41 on the back 11. The worm gear meshes with a worm 42 on the shaft 15. Thus, as the shaft 15 rotates, the single tooth gear 37 is rotated at slow speed and this rotation is transferred by the gear 36 to the odometer or main distance counter 34.

Also, as shown, the instrument to which the present invention is applied is provided with a trip counter comprising a plurality of wheels 43 having numerals showing thru sight openings 44 in the plate 31. The units wheel is connected to a gear 45 on a tens wheel which meshes with a gear 45a driven by the single tooth 37 which drives the main distance counters 34.

As shown in my application Serial No. 728,951, filed June 4, 1934, the instrument is provided with means for indicating the rate of deceleration of the vehicle by which it is carried.

For this purpose, the instrument is provided with a plurality of auxiliary pointers 46a, 46b, and 46c. Each of these pointers is fastened to a separate sleeve 47, and the sleeves are mounted one within the other as shown in Fig. 4. At their lower ends, each sleeve has a ratchet wheel, the ratchet wheel 48a being connected through one of the sleeves 47 to the pointer 46a and the ratchet wheels 48b and 48c being connected by their respective sleeves 47 to the pointers 46b and 46c respectively.

Each ratchet wheel 48a, 48b and 48c is provided with a hub 49 about which is wrapped a hair spring 50, the end of which is soldered or otherwise secured to a post 51. These hair springs tend to move the auxiliary pointers toward zero position on the scale 30, and thus the pointers 46a, 46b and 46c may be said to be normally biased to return to zero position.

The auxiliary pointers are concentric with the main pointer 29 and their ends are located over the scale 30. When the vehicle containing the instrument is started and accelerated, the auxiliary pointers will be picked up by the main pointer by means of a one-way connection between the main and auxiliary pointers.

In the form herein disclosed, this comprises a pin 52 projecting downwardly from the main pointer and adapted to engage the one side of the auxiliary pointers. When, as shown, the pin is located on a radial line between the end of the main pointer and its shaft 28, the auxiliary pointers are provided with a depression 53a into which the pin may extend so that when an auxiliary pointer is being carried forwardly or advanced by the main pointer, the pointed ends of the two pointers will be directly superposed.

The main pointer 29 continues to advance the auxiliary pointers so long as the car is being accelerated or is kept at constant speed. However, in order that the pointers may be held against receding with the main pointer, each of the ratchet wheels 48a, 48b and 48c is provided with a detent or pawl 53 which prevents retrograde motion of its associated ratchet wheel and auxiliary pointer. Thus, immediately upon deceleration of the car, the main pointer moves away or recedes from the auxiliary pointers.

In order to indicate the rate of deceleration, the auxiliary pointers are released periodically and seriatim so that each may recede to the position occupied at the moment by the main pointer. For this purpose, there are provided a plurality of release cams 54, one for each detent 53. In the form shown, each trip cam 54 is provided with a plurality of high-points 55 to cooperate with a follower portion 56 on the detent and the high-points on the respective cams are set arcuately, 30° in the form shown, where there are three high-points on each cam, so that the detents will be moved one after another to release their respective ratchet wheels.

The cams 54 are mounted on a shaft 57 having a bearing in the plate 40, and the lower end of the shaft is provided with a ratchet wheel 58 prevented from retrograde motion by a back check pawl 59 and engaged by a pawl 60 whose lower end is pivoted eccentrically at 61 on the gear 62 meshing with a gear 63a on the worm gear shaft 38. The pawl is provided with a spring 64 for holding it in engagement with the ratchet wheel 58. Thus, as the worm gear shaft 38 rotates, the gear 62 is also rotated, and for each revolution of the latter the ratchet wheel 58 is moved one step. In this way, the cams 54 are moved step-by-step to periodically release the pointers seriatim for receding movement.

It will be understood, of course, that the frequencies with which the pointers are released may be varied as desired. Assuming, for the purpose of illustration, that at each 50 feet of travel of the vehicle one pointer is released and assuming that the vehicle was going at the rate of 68 miles an hour at the time of deceleration as indicated by the position of the pointer 46a in Fig. 1, all of the auxiliary pointers would be left at a position indicating 68 miles an hour as the main pointer 28 receded. During the continued travel of the vehicle, the highpoint 55 on one of the cams 54 would reach the detent 53 of one of the ratchet wheels and release the ratchet wheel and its connected pointer. The released pointer will then be moved counterclockwise by its spring 50 until it has struck the pin 52 on the main pointer 29 and the detent 53 has again engaged its associated ratchet wheel.

The vehicle, in the case of the example illustrated in Fig. 1, was traveling at 30 miles an hour at this time, and hence it is clearly indicated that the vehicle was decelerated from 68 miles an hour to 30 miles an hour in 50 feet or less.

After the vehicle has traveled another 50 feet, the highpoint of another cam 54 will release another pointer, in the case illustrated the pointer 46, and it will move to the position then occupied by the main pointer—20 miles per hour, in the example illustrated in Fig. 1.

If the car is stopped within another 50 feet, the pointer 46a in the example shown, will not be disturbed, and it will be evident that the vehicle was brought from a speed of 68 miles an hour to a standstill in less than 100 feet. If, however, the vehicle had traveled more than 50 feet in the example given, after the pointer 46 is released and set at its new position—at 20 miles an hour, for instance—the pointer 46a would have been released and would have taken the position somewhere between "20" and "0", and the instrument would indicate that within 100 feet from the point at which the car stopped the vehicle was traveling 30 miles per hour or less.

Again, referring to the example shown in Fig. 1, if instead of coming to a stop the vehicle had been operated at 20 miles an hour for 100 feet or more, the pointer 46a would have been released at the first 50 feet of travel at 20 miles per hour and would take its position at "20" as determined by the main pointer 29, and then, at the next 50 feet of travel, the pointer 46b would be released and become superposed at "20" along with the other three auxiliary pointers.

This same procedure will take place when the vehicle is starting up. The pointer 46a, in the example, being the first to be released, will take its position under the main pointer 29. Then, the pointer 46b will be released, and, likewise, take its position under the main pointer, and the same will occur to the pointer 46c, unless the vehicle had been brought to a speed in excess of 20 miles an hour in the case of the pointer 46c, or 30 miles an hour in the case of the pointer 46b, within 150 feet of travel, in which case the pointers would be picked up and carried along by the main pointer.

Thus it will be seen that by means of the auxiliary pointers 46a, 46b and 46c the driver of the vehicle may establish a speed at which he was going within 100 feet of the point at which he stopped, and also the speed at which he was going after having traveled between 50 and 100 feet from the point of deceleration. In the event that the car is abruptly stopped, as in the case of an accident, the pointer 46a, 46b, or 46c which is not on zero position but nearest zero position, will show a speed at or below which the vehicle was traveling at the time it stopped.

The feature of this invention claimed in the divisional application relates to means for indicating how far the car has been driven after it has been last stopped.

For this purpose, there is provided by the present invention, an auxiliary distance counter comprising a dial 65 having numerals showing through a sight opening 66 in the plate 31. According to the present invention, the distance-indicator 65 may be made up of a plurality of wheels like the trip counter 43, but, for practical purposes, it is sufficient to employ only one wheel graduated from "10" to "100" and indicating feet. Consequently, the present invention provides the auxiliary distance counter so that it ceases to operate after the vehicle has traveled 90 feet and remains inoperative or inactive until the vehicle is again stopped.

For this purpose, the disk or wheel 65 is fixed to a shaft 67 which is provided with a gear wheel 68 having star-shaped teeth and having two of the teeth removed so as to provide a space or gap 69 in which the star-shaped teeth of the driving gear 70 may be operated without turning the wheel 68. The driving gear 70 is mounted on a shaft 71 to which is fastened a gear 72 meshing with the gear 63a on the worm gear shaft 38. Thus, during the travel of the vehicle, the gear 72 and gear 70 operate continuously but have no effect on the gear 68 when the latter stands at zero position as shown in Fig. 5.

To bring the counter 65 into operation, there is provided on the gear 26 an arm 73 in position to strike against an arm 74 carried by the shaft 67 for the counter 65. This arm 73 is located on the gear 26 in such position that when the gear moves clockwise and returns to its normal or zero position, it will strike against the arm 74 and move the latter with its gear 68 counter-clockwise to bring the first tooth thereon into position to engage the teeth on the gear 70. The gear 70 is not rotating at this time because the vehicle is stopped. However, when the vehicle again begins to move forward, the rotation of the gear 70 in clockwise direction will be transferred to the gear 68 and counter 65 moving the numbers thereon continuously past the sight opening 66 until the gap 69 is again positioned opposite the driving wheel 70 in which position it is held by a detent spring 75 acting on a ratchet wheel 76.

When the vehicle stops, the arm 73 moves the arm 74 to the left as viewed in Fig. 5, causing the gear 68 to mesh with the operating gear 70. When the vehicle resumes travel, the gear 70 will drive the gear 68 counterclockwise and thus move the arm 74 away from the arm 73. If the vehicle proceeds at a very slow rate at a time when the dial 65 is approaching maximum, the arm 74, coming completely around, may strike the right side of the arm 73 as shown in dotted lines in Fig. 5, and thus be in position to be struck when the arm 73 is moving to the right, which would occur if the vehicle were speeded up. This would not, however, prevent the speed-indicating device from operating when the vehicle is speeded up because, when the gears 68 and 70 are in the position shown in Fig. 5, the pressure of the arm 78 against the arm 74 would turn the gear 68 backwardly and permit the end of the arm 74 to slip under the end of the arm 73, as indicated in Fig. 8. As soon as the arm 74 is clear of the arm 73, the gear 68 would be returned to its normal inactive position by the gear 70.

However, since the teeth on the gears might stop as shown in Fig. 9, delaying for the moment the operation of the speed indicator, the arm 73 may be made sufficiently resilient to bend, so that its lower end will pass over the top of the arm 74 when the arm 73 is moved to the right as shown in Fig. 9. For this purpose, the arm 73 is made comparatively thin and is carried by a heavy relatively stiff arm 73a. The connections between the arms 73 and 73a are such that when the arms move to the left as viewed in Fig. 5 to move the mutilated gear 68 into driving position, the arm 73 does not yield; it only yields when it moves to the right and encounters the arm 74 on the right side of the latter.

Frequently it is necessary to establish that one has stopped at the designated point, for instance at the entrance to an arterial highway. With the device of the present invention, if the driver has in fact stopped, he can establish the distance which he has traveled from the stopping point when halted by an officer or otherwise. By measuring the distance from the stop line to the point where the car was halted and ascertaining the reading of the auxiliary distance counter 65, it may be established whether the vehicle actually stopped at, behind, or ahead of, the stop line.

In addition to this, the device of the present invention is useful and advantageous to the operator of the car, for he may ascertain the distance traveled while shifting gears and may determine the rate of acceleration from the auxiliary distance counter in conjunction with the speed indicator 29.

It should be distinctly understood that the present invention is not limited to the specific kind or type of speedometer herein illustrated, and that variations and modifications may be made within the scope of this invention and portions of the improvements may be used without others.

Having thus described the invention, what is claimed as new and for which it is desired to obtain Letters Patent, is:—

1. In an odometer for motor vehicles, the combination of means responsive to the speed of the vehicle; normally inoperative means for indicating, up to a predetermined distance, the distance traveled; operating means therefor; and means operating by the return of the speed-responsive means to zero position upon the stopping of the vehicle for conditioning the said distance-indicating means for operation by said operating means to indicate, upon resumption of travel of the vehicle, the distance covered since the vehicle was last stopped.

2. In an odometer for motor vehicles, the combination of means responsive to the speed of the vehicle; normally inoperative means for indicating, up to a predetermined distance, the distance traveled; operating means therefor; means operating upon the stopping of the vehicle for conditioning the said distance-indicating means for operation by said operating means to indicate, upon resumption of travel of the vehicle the distance covered since the vehicle was last stopped; and means whereby said distance-indicating means becomes inoperative after a predetermined distance has been traveled since the vehicle was last stopped.

3. In an odometer for motor vehicles, the combination of operating means; means operated by the latter and in accordance with the speed of the vehicle; a counter for indicating the distance traveled; means operated by said operating means in accordance with the distance traveled; and means operated by the second-named means on the return of the latter to zero position when the vehicle is stopped for conditioning said counter for operation by the distance-operated means so that said counter will indicate the distance traveled up to a predetermined point upon the resumption of travel of the vehicle.

4. In an odometer for motor vehicles, the combination of operating means; means operated by the latter and in accordance with the speed of the vehicle; a counter for indicating, up to a predetermined distance, the distance traveled; gearing for operating said counter and normally out of driving relation with said first-named means; and means operated by the second-named means upon stopping of the vehicle to bring said gearing into driving relation with the first-named means.

5. In an odometer for motor vehicles, means operated by the travel of the vehicle; means for indicating, up to a predetermined distance, the distance traveled adapted to be actuated by said operating means but normally disconnected therefrom; and means operated as an incident to the cessation of movement of the vehicle and the said operating means for operatively connecting said distance-indicating means to said operating means to be actuated thereby when the vehicle and said operating means resumes movement.

6. In an odometer for motor vehicles, means operated by the travel of the vehicle and including an operating gear; means for indicating, up to a predetermined distance, the distance traveled including an indicator and a gear connected to rotate together, said operating gear and indicator gear being normally out of mesh; and means operated as an incident to the cessation of movement of the vehicle and said operating means for causing said operating gear and said indicator gear to mesh whereby the indicator and its gear will be rotated by the operating gear when the vehicle and said operating means again resumes movement.

7. In an odometer for motor vehicles, means operated by the travel of the vehicle and including an operating gear; means for indicating, up to a predetermined distance, the distance traveled including an indicator and a mutilated gear connected to rotate together; means for normally holding the mutilated portion of said indicator gear adjacent said operating gear so that the indicator and the indicator gear remain normally inactive; and means operated upon cessation of movement of the vehicle and said operating means for rotating said indicator gear to bring the teeth on the latter in position to mesh with the operating gear whereby the indicator and its gear will be rotated by the operating gear when the vehicle and said operating means again resumes movement.

8. In an odometer for motor vehicles, speed-responsive means; means operated by the travel of the vehicle for operating said speed-responsive means; means for indicating, up to a predetermined distance, the distance traveled adapted to be actuated by said operating means but normally disconnected therefrom; and means operated by said speed-responsive means upon cessation of travel of the vehicle for connecting said distance-indicating means to said operating means to be actuated thereby when the vehicle and said operating means resume movement.

9. In an odometer for motor vehicles, speed-responsive means; means operated by the travel of the vehicle for operating said speed-responsive means, and including an operating gear; means for indicating, up to a predetermined distance, the distance traveled including an indicator and a gear connected to rotate together, said operating gear and indicating gear being normally out of mesh; and means operated by said speed-responsive means upon cessation of travel of the vehicle for causing said operating gear and said indicating gear to mesh whereby the indicator and its gear will be rotated by the operating gear when the vehicle and said operating means again resumes movement.

10. In an odometer for motor vehicles, speed-responsive means; means operated by the travel of the vehicle for operating said speed, responsive means and including an operating gear; means for indicating, up to a predetermined distance, the distance traveled including an indicator and a mutilated gear connected to rotate together; means for normally holding the mutilated portion of said indicator gear adjacent said operating gear so that the indicator and its gear normally remain inactive; an arm operated by said speed-responsive means upon cessation of movement of the vehicle and said operating means; and an arm operated by said first-named arm and connected to rotate with said indicator gear to move the latter so as to bring the teeth thereon in position to mesh with the operating gear whereby the indicator and its gear will be rotated by the operating gear when the vehicle and said operating means again resumes movement.

11. In an odometer for motor vehicles, speed-responsive means; means operated by the travel of the vehicle for operating said speed-responsive means, and including an operating gear; means for indicating, up to a predetermined distance, the distance traveled including an indicator and a mutilated gear connected to rotate together; means for normally holding the mutilated portion of said indicator gear adjacent said operating gear so that the indicator and the indicator gear remain normally inactive; an arm operated by said speed-responsive means upon cessation of movement of the vehicle and said operating means; and an arm operated by said first-named arm and connected to rotate with said indicator gear to move the latter so as to bring the teeth thereon in position to mesh with the operating gear whereby the indicator and its gear will be rotated by the operating gear when the vehicle and said operating means again resume movement, said indicator gear returning to starting position and presenting its mutilated portion to the operating gear and its arm in position to be engaged by the arm on the speed-responsive means after the resumed travel of the vehicle has continued for a predetermined distance.

EDWARD V. DARDANI.